Figure 1:
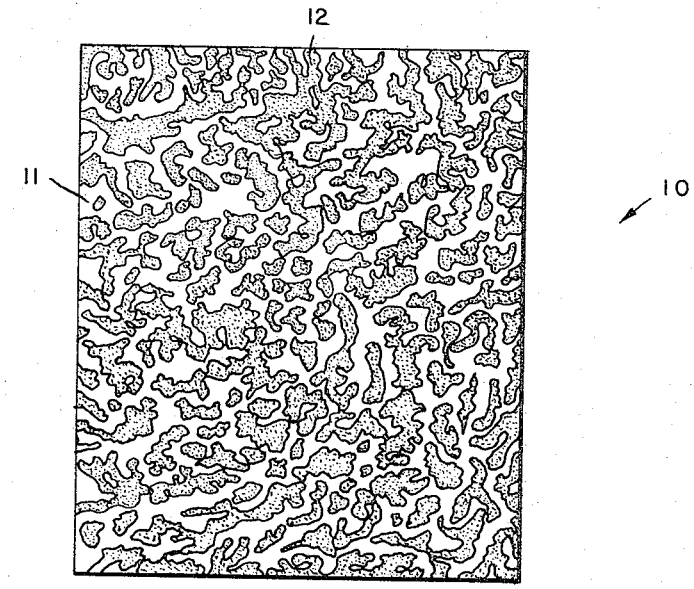

Aug. 22, 1967  R. H. KROCK ET AL  3,337,338
TUNGSTEN POWDER BODIES INFILTRATED WITH COPPER-TITANIUM
BISMUTH OR COPPER-TITANIUM-TIN
Original Filed May 26, 1966

INVENTORS
RICHARD H. KROCK
EDWARD J. ZDANUK
BY
ATTORNEY

United States Patent Office 3,337,338
Patented Aug. 22, 1967

3,337,338
TUNGSTEN POWDER BODIES INFILTRATED WITH COPPER - TITANIUM BISMUTH OR COPPER-TITANIUM-TIN
Richard H. Krock, Peabody, and Edward J. Zdanuk, Lexington, Mass., assignors to P. R. Mallory & Co., Inc., Indianapolis, Ind., a corporation of Delaware
Original application May 26, 1966, Ser. No. 553,106, now Patent No. 3,305,324, dated Feb. 21, 1967. Divided and this application Oct. 21, 1966, Ser. No. 604,088
11 Claims. (Cl. 75—208)

This is a division of application Ser. No. 553,106, filed May 26, 1966, now Patent No. 3,305,324.

The present invention relates to powder metallurgy and more particularly to improved means and methods of providing composite materials for use as an electrical contact material.

It was found that using vacuum infiltration techniques, copper-titanium-bismuth or copper-titanium-tin alloys, titanium sandwiched between copper-bismuth or copper-tin alloys and a tungsten powder body subsequently heated to form copper-titanium-bismuth or copper-titanium-tin alloy, a tungsten powder body coated with titanium by electroplating or vapor phase plating, and the like, wet individual particles of the tungsten powder body so as to allow infiltration of the powder body with copper-titanium-bismuth or copper-titanium-tin alloys. It is believed that the resultant composite bodies have a high concentration of titanium in the interface region between the tungsten particles and the copper-titanium-bismuth or the copper-titanium-tin alloy thereby raising the over all electrical conductivity of the copper alloy matrix. The use of vacuum infiltration techniques also deacreases the volume of hydrogen present in the resultant tungsten-copper-titanium-bismuth and the tungsten-copper-titanium-tin composites by more than an order and decreases the volume of all gaseous components by several orders.

Although complete and substantially instantaneous infiltration of copper into sintered tungsten bodies is conveniently carried out in an atmosphere of hydrogen, a copper melt shows no penetration into tungsten powder bodies in a vacuum atmosphere using comparable time-temperature treatments and using standard metallurgical procedures. In carrying out the present invention, it was found that subjecting the tungsten powder body and a contacting copper-titanium-bismuth alloy or a copper-titanium-tin alloy to a vacuum infiltration process, the copper-titanium-bismuth alloy and the copper-titanium-tin alloy were absorbed into the tungsten body by capillary attraction. It is thought that in each instance the titanium promotes wetting of the tungsten particles by the copper-titanium-bismuth alloy and the copper-titanium-tin alloy.

The bismuth and the tin are used in the resultant composite contact materials to sustain an arc at low values of current and voltages during the operation of the composite contact material in vacuum environments.

Tungsten is used in electrical contact materials because of its inherent characteristics of hardness and of resistance to arcing which reduces pitting of the tungsten contact material. However, pure tungsten contact material possesses high electrical resistance which lowers the efficiency and reliability of the tungsten contact material.

It has been suggested that a composite of tungsten-copper used as an electrical contact material would make advantageous use of the several outstanding characteristics of both metals. In the composite, the copper provides the current carrying capability and thermal conductivity while the tungsten contributes hardness, resistance to arc erosion, and superior anti-weld properties. In order to utilize the aforementioned characteristics of the copper and the tungsten, it is necessary to fabricate the metal into a tungsten-copper composite.

Copper and tungsten are mutually insoluble and form no alloys in the metallurgical sense, but mixtures of the two metals are usually referred to as alloys but are, technically speaking, composites. Composites of tungsten-copper may be prepared by pressing the mixed metal powders to the required shape in dies, and subsequently sintering in a hydrogen atmosphere above the melting point temperature of the copper, preferably between 1250° and 1350° centigrade. The hydrogen acts as a flux and the molten copper wets the tungsten particles and cements them together. Another method which provides a harder resultant body consists of first pressing and sintering the tungsten powder so as to form a coherent but porous body, which is then heated at a temperature of about 1200° C. to 1300° C. in a hydrogen atmosphere and in contact with molten copper. The copper is absorbed into the pores of the tungsten powder body by capillary attraction. The copper infiltrant imparts strength and ductility to the tungsten powder body and also provides the resultant body with higher current carrying capability and thermal conductivity. However, using standard metallurgical procedures, a copper melt shows no penetration into the tungsten powder body in a vacuum. It is thought that the lack of penetration of the copper into the tungsten powder body is due to the unfavorable surface energies that are present in the vacuum.

If there is no solubility between the metals as is the situation between tungsten and copper, and if the wetting is poor, an auxiliary agent for influencing the surface energies in the desired direction is required.

It was found that by utilizing small amounts of titanium and by using vacuum infiltration techniques, melts of copper-titanium-bismuth and copper-titanium-tin completely infiltrated tungsten powder bodies. It is thought the titanium either raises the surface energies of the melts or of the solid, or lowers the surface energy of the interface between the melt and the solid thereby favoring infiltration of the melt into the tungsten powder body. It is thought the vacuum serves the dual purpose of promoting the penetration of the melt into the tungsten powder body and of significantly decreasing the volume of all gases present. The resultant tungsten-copper-titanium-bismuth and tungsten-copper-titanium-tin must contain a low volume of gas before the material is acceptable for application in vacuum environments.

The additions of bismuth and tin to the composites provides a resultant composite contact material that does sustain an arc at low magnitudes of current and voltages during the operation of the contact materials in a vacuum atmosphere environment. It is thought that the foregoing occurrence is due to the relatively high vapor pressures of bismuth and of tin.

Therefore, it is an object of the present invention to provide composite materials suitable for use as contact materials in vacuum electrical switching devices.

Another object of the present invention is to provide composite materials of tungsten particles in matrices of copper-titanium-bismuth and of copper-titanium-tin for use as electrical contact materials wherein the concentration of titanium in the tungsten interface region is much higher than the concentration of titanium between the tungsten particles thereby raising the overall electrical conductivity of the alloy matrices.

Still another object of the present invention is to provide composite materials for use in vacuum environments which does sustain an electrical arc at low current and voltages during operation of the contact materials.

Yet another object of the present invention is to provide a means and method of vacuum infiltrating a refractory material with electrically conducting materials thereby providing composite contact materials which are low in gas content and low in material which may be converted to gas during operation of the contacts.

Yet still another object of the present invention is to provide means and methods of using copper-titanium-bismuth alloys and copper-titanium-tin alloys as infiltration stock for tungsten powder bodies so as to allow complete vacuum infiltration of the tungsten powder body thereby providing a composite contact material having integrally joined tungsten-copper-titanium-bismuth and tungsten-copper-titanium-tin contact materials.

A further object of the presents invention is to provide means and methods of fabricating composite contact materials using vacuum infiltration techniques, the composite contact materials having high electrical and thermal conductivity, combined with low erosion under arcing and low deformation under pressure environments.

Another object of the present invention is to provide alloys which include an agent that wets the tungsten, that is ductile, that has high electrical and thermal conductivity, and includes a melting point that is lower than tungsten.

The present invention, in another of its aspects relates to novel features of the instrumentalities of the invention described herein for teaching the principal object of the invention and to the novel principles employed in the instrumentalities whether or not these features and principles may be used in the said object and/or in the said field.

With the aforementioned objects enumerated, other objecst will be apparent to those persons possessing ordinary skill in the art. Other objects will appear in the following description and in the appended claims.

In the drawings:

FIGURE 1 is a photomicrograph of about 500 magnifications of a tungsten-copper-titanium-bismuth composite contact material showing a sintered tungsten specimen completely vacuum infiltrated with a copper-titanium-bismuth alloy containing about 0.10 percent by weight, titanium, 5 percent, by weight, bismuth, the remainder copper. The infiltration was carried out at about 1250° C. for about 1 hour at a pressure of about $10^{-5}$ torr.

Figure 2:
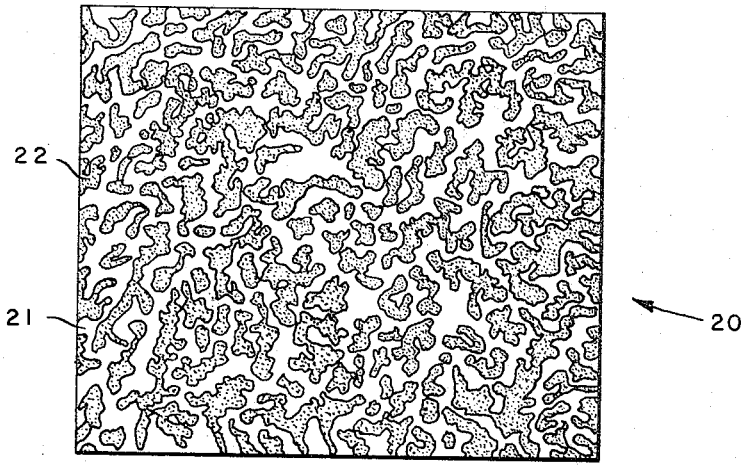

FIGURE 2 is a photomicrograph of about 500 magnifications of tungsten-copper-titanium-tin composite contact material showing a sintered tungsten specimen completely vacuum infiltrated with a copper-titanium-tin alloy containing about 0.10 percent, by weight, titanium, 5 percent, by weight, tin, and the remainder copper. The infiltration was carried out at about 1250° C. for about 1 hour at a pressure of about $10^{-5}$ torr.

Generally speaking, the means and methods of the present invention relate to electrical contact materials for use in switching devices such as, for example, in a vacuum electrical power switching means. The contact materials consist of tungsten bodies completely vacuum infiltrated by a copper-titanium-bismuth alloy or by a copper-titanium-tin alloy. The copper-titanium-bismuth alloy consists of 0.1 to 0.25 percent, by weight, titanium, 5 to 12.5 percent, by weight, tin, and the remainder copper. The copper-titanium-tin alloy consists of 0.1 to 0.25 percent, by weight, titanium, 5 to 12.5 percent, by weight, tin, and the remainder copper.

The method of making a tungsten body infiltrated with alloys of copper comprises the steps of compacting powdered tungsten particles into desired body shape. The tungsten body is contacted with a copper-titanium-bismuth alloy or a copper-titanium-tin alloy which when heated above their respective melting points make use of their ability as an agent for wetting the tungsten particles. The tungsten body and the contacting copper alloy are placed in a vacuum atmosphere and heated so as to completely vacuum infiltrate the tungsten body with the copper alloy by capillary attraction thereby forming a composite contact material.

More particularly, the means and methods of the present invention relate to fabricating tungsten bodies infiltrated with an alloy of copper-titanium-bismuth or copper-titanium-tin for use as an electrical contact in vacuum environments. The tungsten powder has a particle size ranging between 1 and 10 microns and is compacted under pressure ranging from 20 to 35 tons per square inch into a desired body shape. The tungsten body may be presintered in a hydrogen atmosphere at about 1250° centigrade for about 10 minutes. The surfaces of the sintered tungsten body are contacted with an alloy of copper-titanium-bismuth or of copper-titanium-tin. The copper-titanium-bismuth alloy consists of 0.1 and 0.25 percent, by weight, titanium, 5 to 12.5 percent by weight bismuth, the remainder copper. The copper-titanium-tin alloy consists of 0.1 to 0.25, percent, by weight, 5 to 12.5 percent, by weight, tin, the remainder copper. In all instances, the titanium is used to promote the wetting of the tungsten particles by the copper-titanium-bismuth and the copper-titanium-tin alloys. The tungsten body and the contacting copper alloy are placed in a vacuum atmosphere having a pressure of about $10^{-5}$ torr and heated at a temperature of between 1250° and 1450° centigrade for a time duration of between 20 minutes and 60 minutes. The tungsten body is completely vacuum infiltrated with the copper alloy thereby forming a tungsten-copper-titanium-bismuth or a tungsten-copper-titanium-tin composite for use as a contact material in vacuum environments.

Exceeding 12.5 percent, by weight, of either bismuth or tin, in the composite material or exceeding 0.25 percent, by weight, of titanium in the composite material detrimentally affects the electrical conductivity of the resultant composite such that the composite no longer has optimum electrical conductivity characteristics. It should be noted that if other property or properties of the composite is or are desired to be optimized, the percentage, by weight, of bismuth or tin may exceed the range specified herein. However, it was found that less than 0.1 percent, by weight, titanium seriously reduces the rate of infiltration of the compact by the copper alloy. However, complete infiltration of the compact by copper may be achieved by a much longer and hence impractical time-temperature cycle.

In carrying out the present invention, it was found for a tungsten-copper system, alloys of copper-titanium-bismuth or of copper-titanium-tin having small amounts of titanium when brought into contact with the tungsten powder body in a heated vacuum environment resulted in the copper alloys completely infiltrating the tungsten powder body and forming a dense composite material in each instance. It is thought that the small amount of titanium is sufficient to either raise the surface energies of the melt of the copper alloys or of the tungsten particles or lower the surface energy of the interface between the melt and the solid.

The resultant composites are dense and have high electrical and thermal conductivity combined with high resistance to deformation under pressure.

In forming the tungsten powder body a suitable mold is utilized to form the tungsten powder into a desired shape. The size of the particles of tungsten may vary in accordance with the desired density of the composite contact material and with the desired pore size distribution of the composite contact material. For illustrative purposes, tungsten powder having a particle size of about 1 micron to 10 microns is utilized. However, it should be understood that tungsten powder having a larger or a smaller particle size may be used.

The tungsten particles are compacted with the confines of a suitable mold by a compacting pressure ranging between 20 and 35 tons per square inch thereby forming a porous tungsten body. If it is desired to further strengthen the tungsten body prior to infiltration and/or provide a composite having a higher tungsten content, the tungsten body may be sintered in an atmosphere of hydrogen at a temperature of about 1250° C. for a time duration of about 10 minutes. FIGURES 1 and 2 show a composite structure wherein the tungsten compacts were presintered. After the preparatory treatment is completed, the strength of the tungsten compact is materially increased, and the compacts can be handled readily. Very little grain growth takes place during the presinter treatment, and the increase in strength of the compact may be due to the reduction of the surface film of oxide on the individual tungsten particles, the reduced metal acting as a cement which binds the tungsten particles together.

It should be pointed out that the presinter of the tungsten compact in the hydrogen atmosphere is not a necessary prerequisite to the successful infiltration of the tungsten powder body with the copper alloys described hereinbefore.

The tungsten specimen, presintered or not, is placed in a vacuum having a pressure of $10^{-5}$ torr or less and contacted with a copper alloy containing about 0.25 percent, by weight, or less of titanium and 12.5 percent, by weight, or less bismuth or of tin. The tungsten specimen and the contacting copper alloy are heated to a temperature of between about 1200° C. to 1450° C. The range of temperatures exceeds the 1080° C. maximum melting point temperature of the aforementioned copper alloys but is below the 3410° C. melting point temperature of tungsten.

A chemical analysis of the resultant composite body showed that vacuum processing decreases the volume of hydrogen by more than an order and decreases the volume of other gaseous components by several orders.

It is believed that an electron probe analysis of the region between tungsten particles composed of the copper-titanium-bismuth alloy or of the copper-titanium-tin alloy will show a segregation or a high concentration of titanium in the interface region between the tungsten particles and copper-titanium-bismuth alloy and between the tungsten particles and the copper-titanium-tin alloy. This would explain how relatively small additions of titanium can remain highly active during the extensive penetration of the tungsten body by infiltrant.

With such a gradation in titanium concentration of titanium in the tungsten interface region than the nominal concentration in the infiltration stock is expected. The bulk of the region between the tungsten particles contains a much lower concentration of titanium than that used in the infiltration stock. Since titanium in solid solution lowers the conductivity of copper, the titanium segregation has a dual advantage, that is, in addition to promoting the wetting and infiltration in a vacuum environment, the segregation also raises the overall electrical conductivity of the infiltration alloy above that which would be expected from the nominal concentration of the infiltration stock.

Referring to the drawings, FIGURE 1 illustrates a tungsten-copper-titanium-bismuth composite 10 consisting of a sintered porous compact of tungsten particles 11 which has been completely infiltrated by a coherent network of copper-titanium-bismuth 12. The metal surfaces of the copper-titanium-bismuth mixture are integrally bonded with the tungsten particles. The copper-titanium alloy used to contact the tungsten powder body prior to vacuum infiltration contains about 0.1 percent, by weight, titanium, 5 percent, by weight, bismuth, and the remainder copper. During vacuum infiltration, the porous tungsten body and the contacting alloy were subjected to a temperature of about 1250° C. for about 60 minutes at a pressure of $10^{-5}$ torr or less.

FIGURE 2 shows a tungsten-copper-titanium-tin composite 20 consisting of a porous compact of tungsten particles 21 has been completely infiltrated by a coherent network of copper-titanium-tin 22. The metal surfaces of the copper-titanium-tin alloy are integrally bonded with the tungsten particles. The copper-titanium-tin alloy used to contact the tungsten powder body prior to vacuum infiltration contains about 0.1 percent, by weight, titanium, 5 percent, by weight, tin and the remainder copper. During vacuum infiltration, the porous tungsten body and the contacting alloy were subjected to a temperature of about 1250° C. for about 60 minutes at a pressure of $10^{-5}$ torr, or less.

The following Examples 1 to 4 are illustrative of the preparation of tungsten-copper-titanium-bismuth contact materials by vacuum infiltration of a tungsten powder body with copper-titanium-bismuth alloys. Examples 5 to 8 are illustrative of the preparation of the tungsten-copper-tin contact materials by vacuum infiltration of a tungsten powder body with copper-titanium-tin alloys.

*Example 1*

A sintered tungsten body completely vacuum infiltrated by an alloy of copper-titanium-bismuth the alloy containing about 0.1 percent, by weight, titanium, 5 percent, by weight, bismuth, the remainder copper.

Powdered tungsten having a particle size of about 1 to 10 microns was pressed by any suitable means such as by an automatic press at about 20 tons per square inch to provide a green compact sturdy enough to be handled. The green compact was presintered at about 1250° C. for about 10 minutes in an atmosphere of hydrogen so as to form a skeleton type structure. The presintering of the compact serves to increase the strength of the compact by cementing the tungsten particles each to the other thereby binding them together. The sintered porous compact is contacted with an alloy of copper-titanium-bismuth having a titanium content of about 0.1 percent, by weight, 5 percent, by weight, bismuth, the remainder copper. The sintered tungsten compact and the contacting copper alloy are placed in a vacuum atmosphere having a pressure of about $10^{-5}$ or less and are heated at a temperature of about 1250° C. for a time duration of about 1 hour. Also, an individual tungsten-copper-titanium-bismuth composite was prepared using a time-temperature treatment of about 1450° centigrade for about 20 minutes using the above-mentioned procedure. In each instance the porous tungsten body was found to be completely vacuum infiltrated by the copper-titanium-bismuth alloy. The resultant tungsten-copper-titanium-bismuth composite is illustrated in FIGURE 1 of the drawing.

*Example 2*

A green tungsten powder body completely vacuum infiltrated by an alloy copper-titanium-bismuth, the alloy of copper-titanium-bismuth containing about 0.1 percent, by weight, titanium, 5 percent, by weight, bismuth, the remainder copper.

Powdered tungsten having a particle size of about 1 micron to about 10 microns was pressed by any suitable means such as by an automatic press at about 20 tons per square inch to provide a green compact sturdy enough to be handled. The porous green compact is contacted with an alloy of copper-titanium-bismuth having a titanium content of about 0.1 percent, by weight, titanium, 5 percent, by weight, bismuth, the remainder copper. The green tungsten compact and the contacting alloy of copper-titanium-bismuth are placed in a vacuum atmosphere having a pressure of $10^{-5}$ torr or less and are heated at about 1250° centigrade for about 1 hour. In addition, an individual tungsten-copper-titanium-bismuth composite was prepared using a time-temperature treatment of about 1450° centigrade for about 20 minutes using the above-mentioned procedure. In each instance, the porous tungsten body was found to be completely infiltrated by the copper-titanium-bismuth alloy.

*Example 3*

A green tungsten powder body completely vacuum infiltrated by an alloy of copper-titanium-bismuth.

The procedure of Example 2 was followed using an alloy of copper containing about 0.25 percent, by weight, titanium, 12.5 percent, by weight, bismuth, and the remainder copper. The composite was formed by heating to about 1450° C. for about 20 minutes and another composite was formed by heating to about 1250° C. for about 1 hour using the aforementioned procedure.

*Example 4*

A sintered tungsten powder body completely vacuum infiltrated by an alloy of copper-titanium-bismuth.

The procedure of Example 1 was followed using an alloy of copper containing about 0.25 percent, by weight, titanium, 12.5 percent, by weight, bismuth, and the remainder copper. The composite was formed by heating to about 1450° C. for about 20 minutes and another composite was formed by heating to about 1250° C. for about 1 hour using the aforementioned procedure.

*Example 5*

A sintered tungsten body completely vacuum infiltrated by an alloy of copper-titanium-tin, the alloy of copper-titanium-tin containing about 0.1 percent, by weight, titanium, 5 percent, by weight, tin, the remainder copper.

Powdered tungsten having a particle size of about 1 micron to about 10 microns was pressed by any suitable means such as by an automatic press at about 20 tons per square inch to provide a green compact sturdy enough to be handled. The green compact was sintered at a temperature of about 1250° centigrade for about 10 minutes in a hydrogen atmosphere. The sintered porous tungsten compact is contacted with an alloy of about 0.1 percent, by weight, titanium, 5 percent, by weight, tin, the remainder copper. The sintered tungsten compact and the contacting copper alloy were placed in a vacuum atmosphere having a pressure of $10^{-5}$ torr or less and heated at about 1250° centigrade for about 1 hour. Also, an individual tungsten-copper-titanium-tin composite was prepared using a time-temperature treatment of about 1450° centigrade for about 20 minutes using the above procedure. In each instance the porous tungsten body was found to be completely infiltrated by the copper-titanium-tin alloy.

*Example 6*

A green tungsten powder body completely vacuum infiltrated by an alloy of copper-titanium-tin.

Powdered tungsten having a particle size of about 1 micron to about 10 microns was pressed by any suitable means such as by an automatic press at about 20 tons per square inch to provide a green compact sturdy enough to be handled. The green porous tungsten compact was contacted with a copper alloy containing about 0.1 percent, by weight, titanium, 5 percent, by weight, tin, the remainder copper. The green tungsten compact and the contacting alloy of copper-titanium were placed in a vacuum atmosphere having a pressure of $10^{-5}$ torr or less and were heated at about 1250° centigrade for about 1 hour. Also, an individual tungsten-copper-titanium-tin composite was prepared using a time-temperature treatment of about 1450° centigrade for about 20 minutes using the above procedure. In each instance, the porous tungsten body was found to be completely infiltrated by the copper-titanium-tin alloy.

*Example 7*

A green tungsten powder body completely vacuum infiltrated by an alloy of copper-titanium-tin.

The procedure of Example 6 was followed using an alloy of copper containing about 0.25 percent, by weight, titanium, 12.5 percent, by weight, tin and the remainder copper. The composite was heated to about 1450° C. for about 20 minutes and another composite was heated to about 1250° centrigrade for about 1 hour using the aforementioned procedure.

*Example 8*

A sintered tungsten powder body completely vacuum infiltrated by an alloy of copper-titanium-tin.

The procedure of Example 5 was followed using an alloy of copper containing about 0.25 percent, by weight, titanium, 12.5 percent, by weight, tin, and the remainder copper. The composite was heated to about 1450° C. for about 20 minutes and another composite was heated to about 1250° centigrade for about 1 hour using the aforementioned procedure.

It should be noted that an increase in the temperature treatment results in a decrease in the time treatment required to completely vacuum infiltrate the tungsten body with the ternary alloy of copper. An increase in the bismuth or the tin content in the copper alloy requires an increase in amount of titanium contained in the alloy in order to successfully vacuum infiltrate in the time-temperature treatments specified.

It is thought that the tungsten powder body or the presintered tungsten body may be coated with titanium by electroplating or vapor phase plating, impregnation of the coated body could be carried out successfully with binary alloys of copper-bismuth and copper-tin. Vacuum impregnation will occur as long as titanium is at the boundary. The amount of plated titanium would be such that its composition would amount to 0.1 to 0.25 percent by weight of that of the amount of the binary copper alloy required to fill the voids.

The present invention is not intended to be limited to the disclosure herein, and changes and modifications may be made by those skilled in the art without departing from the spirit and the scope of the present invention. Such modifications and variations are considered to be within the purview and the scope of the present invention and the appended claims.

Having thus described our invention, we claim:

1. A method of making a tungsten powder body infiltrated with a ternary alloy of copper for use as an electrical contact material in vacuum environments comprising the steps of compacting tungsten particles into a desired body shape; contacting the surfaces of the compacted tungsten body with said ternary alloy of copper, said alloy containing an agent for promoting the wetting of said tungsten particles; placing said tungsten body and said contacting alloy in a vacuum atmosphere; and heating said tungsten body and said contacting alloy so as to completely vacuum infiltrate said tungsten body with said alloy of copper thereby forming a composite material for use as a contact material in a vacuum switching device.

2. The method according to claim 1, wherein said agent for promoting wetting of said tungsten particles is titanium.

3. The method according to claim 1, wherein said ternary copper alloy consists of about 0.1 to 0.25 percent, by weight, titanium, 5.0 to 12.5 percent, by weight, bismuth, the remainder copper.

4. The method according to claim 1, wherein said ternary copper alloy consists of about 0.1 to 0.25 percent, by weight, titanium, 5.0 to 12.5 percent, by weight, tin, the remainder copper.

5. The method according to claim 1, wherein said vacuum atmosphere has a pressure of not more than $10^{-5}$ torr.

6. The method according to claim 1, wherein said heating is to a temperature of between about 1250° C. and 1450° C. for a time duration of between about 20 minutes and 60 minutes.

7. The method according to claim 1, wherein the particle size of said tungsten is between about 1 to 10 microns.

8. The method according to claim 1, wherein the compacting pressure is about 20 tons per square inch.

9. The method according to claim 1, including the additional step of sintering said compacted tungsten body in a hydrogen atmosphere at a temperature of about 1250° C. for a time duration of about 10 minutes.

10. A method of making a tungsten powder body infiltrated with an alloy of copper-titanium-bismuth for use as an electrical contact material in vacuum environments comprising the steps of: compacting tungsten powder having a particle size ranging between 1 and 10 microns under a pressure ranging from 20 to 50 tons per square inch into a desired body shape; sintering said compacted tungsten body in a vacuum; contacting the surfaces of said sintered tungsten body with an alloy of copper-titanium-bismuth, said copper-titanium-bismuth alloy consisting of about 0.1 to 0.25 percent, by weight, titanium, 5.0 to 12.5 percent, by weight, bismuth, the remainder copper, said titanium for promoting the wetting of said tungsten particles; placing said tungsten body and said contacting copper-titanium-bismuth alloy in a vacuum with a pressure of less than $10^{-5}$ torr; and heating said tungsten body and said copper-titanium-bismuth alloy at a temperature of between 1250° C. and 1450° C. for a time duration of between about 20 minutes and 60 minutes so as to completely vacuum infiltrate said tungsten body with said copper-titanium-bismuth alloy thereby forming a tungsten-copper-titanium-bismuth composite material for use as a contact material in a vacuum switching device.

11. A method of making a tungsten powder body infiltrated with an alloy of copper-titanium-tin for use as an electrical contact material in vacuum environments comprising the steps of: compacting tungsten powder having a particle size ranging between 1 and 10 microns under a pressure ranging from 20 to 50 tons per square inch into a desired body shape; sintering said compacted tungsten body in a vacuum; contacting the surfaces of said sintered tungsten body with an alloy of copper-titanium-tin, said copper-titanium-tin alloy consisting of about 0.1 to 0.25 percent, by weight, titanium, 5.0 to 12.5 percent, by weight, tin, said titanium for promoting the wetting of said tungsten particles; placing said tungsten body and said contacting copper-titanium-tin alloy in a vacuum with a pressure of less than $10^{-5}$ torr; and heating said tungsten body and said copper-titanium-tin alloy at a temperature of between 1250° C. and 1450° C. for a time duration of between about 20 minutes and 60 minutes so as to completely vacuum infiltrate said tungsten body with said copper-titanium-tin alloy thereby forming a tungsten-copper-titanium-tin composite material for use as a contact material in a vacuum switching device.

References Cited

UNITED STATES PATENTS

| | | | |
|---|---|---|---|
| 2,797,300 | 6/1957 | Hawthorne | 75—164 |
| 3,303,026 | 2/1967 | Zdanuk | 75—208 |

BENJAMIN R. PADGETT, *Primary Examiner.*

A. J. STEINER, *Assistant Examiner.*